(12) United States Patent
Hicks et al.

(10) Patent No.: US 6,367,335 B1
(45) Date of Patent: Apr. 9, 2002

(54) STRAIN SENSOR FOR OPTICAL FIBERS

(75) Inventors: Thomas Rudolph Hicks; Newrick Kenneth Reay, both of London; Paul David Atherton, Hampton, all of (GB)

(73) Assignee: SDL, Inc., San Jose, CA (US)

( * ) Notice: Subject to any disclaimer, the term of this patent is extended or adjusted under 35 U.S.C. 154(b) by 0 days.

(21) Appl. No.: 09/489,439

(22) Filed: Jan. 21, 2000

(51) Int. Cl.$^7$ .................................................. G01L 1/24
(52) U.S. Cl. ........................ 73/800; 385/13; 250/227.14
(58) Field of Search .............................. 73/800; 385/12, 385/13; 250/227.14

(56) References Cited

U.S. PATENT DOCUMENTS

| | | | | |
|---|---|---|---|---|
| 4,725,728 A | * | 2/1988 | Brininstool et al. | 250/227 |
| 5,007,705 A | | 4/1991 | Morey et al. | 350/96.29 |
| 5,177,805 A | * | 1/1993 | Groger et al. | 385/12 |
| 5,682,445 A | * | 10/1997 | Smith | 385/7 |
| 5,889,901 A | * | 3/1999 | Andeson et al. | 385/12 |
| 5,942,750 A | * | 8/1999 | Sannerhaugen et al. | 250/227.14 |

FOREIGN PATENT DOCUMENTS

WO    WO 00/07047    2/2000

OTHER PUBLICATIONS

Andreas Othonos, et al.; "Fiber Bragg Gratings, Fundamentals and Applications in Telecommunications and Sensing, Chapter 3, Properties of Fiber Bragg Gratings"; Artech House; pp. 95–99.

H.G. Limberger et al.; "Wibeband Tuneable Fibre Bragg Grating Filters"; ECOC'99, Sep. 26–30, 1999; pp. 156–159.

Alessandrom Iocco et al.; "Bragg Grating Fast Tunable Filter for Wavelength Division Multiplexing"; Journal of Lightwave Technology, vol. 17, No. 7, Jul. 1999; pp. 1217–1221.

G.A. Ball et al.; "Compression–tuned Single–Frequency Bragg Grating Fiber Laser"; Optics Letters; vol. 19, No. 23, Dec. 1, 1994, pp. 1979–1981.

Thomas R. Hicks et al.; "The NanoPositioning Book, Chapter 3, Servo Control", Queensgate Instruments Ltd. 1997; pp. 27–42.

* cited by examiner

*Primary Examiner*—Max Noori
(74) *Attorney, Agent, or Firm*—Kudirka & Jobse, LLP (57) ABSTRACT

A strain sensor is disclosed for example for use in a Bragg fiber grating, in which piezoelectric actuators are arranged to compress or extend the fiber, and a capacitance micrometer for measuring the strain on the fiber in a servo loop with the actuators to provide a tunable grating in which the selected wavelength is a unique and linear function of the control command parameter. The micrometer electrodes can be placed on opposing faces of ferrules on the fiber, or capacitance between a coating directly on the fiber and a reference electrode can be used.

26 Claims, 6 Drawing Sheets

STRAIN SENSOR FOR OPTICAL FIBERS

DESCRIPTION

1. Technical Field

The invention relates to a strain sensor for optical fibers, preferably in relation to tunable optical wavelength filtering in fiber optic based systems.

2. Background Art

Filters based on fiber Bragg gratings are finding increasing use for wavelength selection and de-selection in fiber optic based systems. The theory and construction of these filters are well known, see for example Andreas Othonos, Kyriacos Kalli "Fiber Bragg Gratings. Fundamentals and Applications in Telecommunications and Sensing." Published by Artec House Inc. 1999, ISBN 0-89006-344-3. In such filters the refractive index of a section of optical fiber varies periodically along its length, giving regions of alternate high and low index. Light whose wavelength is twice the optical spacing between successive regions of high index will be reflected back along the fiber, whereas all other wavelengths will be transmitted. The bandwidth of the reflected light will depend on the length of modified fiber (the length of the fiber Bragg grating); typically the bandwidth is given by the wavelength divided by the number of consecutive high/low index regions. In practice, fiber Bragg grating lengths can be a millimeter or two up to several tens of millimeters depending on the application.

A filter so described will reflect at a fixed wavelength, but it is often convenient to be able to vary the reflected wavelength. This can be achieved by varying the optical spacing of the grating, either by varying the refractive index of the fiber material or by straining the fiber to alter its physical length. Many such devices are known. For example Limberger H. G., Iocco A., Salathé R. P., Everall L. A., Chisholm K. E., Bennion I. "Wideband Tuneable Fibre Bragg Grating Filters." ECOC '99 September 1999, Nice, France; and Alessandro Iocco, Hans Georg Limberger, René Paul Salathé, Lorna A. Everall, Karen E. Chisholm, John A. R. Williams, Ian Bennion. "Bragg Grating Fast Tunable Filter for Wavelength Division Multiplexing." Journal of Lightwave Technology, Vol. 17, No. 7, July 1999, describe systems using piezoelectric actuators to stretch or compress a fiber Bragg grating and thus alter its reflected wavelength. In an alternative known arrangement described in Ball G. A., Morey W. W. "Compression-tuned single-frequency Bragg grating fiber laser.", Optics Letters, Vol. 19, No. 23, Dec. 1, 1994, stepper motors and lead-screws are used to achieve strain variation. U.S. Pat. No. 5,007,705 issued Apr. 16, 1991 and assigned to United Technologies Corporation achieves refractive index variation by various means including temperature, or strain variation. The contents of these references are incorporated herein by reference to the extent that they teach the background art of tunable fiber Bragg gratings.

Figure 1A:
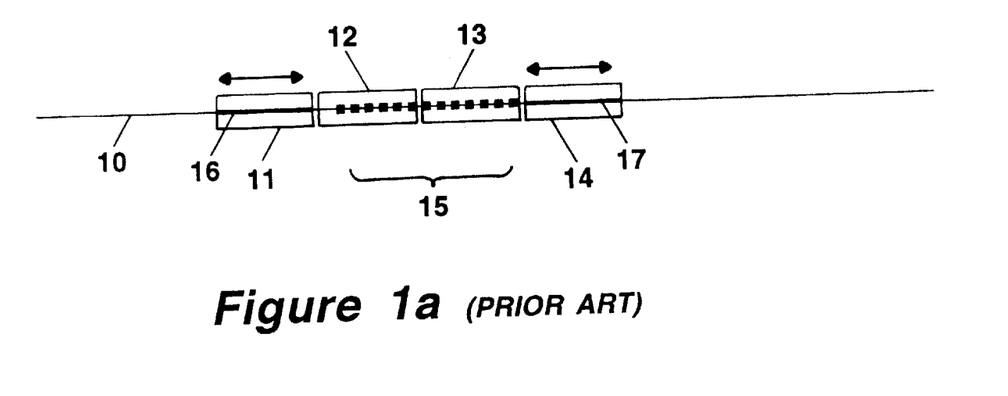
FIG. 1a is a schematic view showing a known linear strain system.

In Ball et. al. referenced above, the arrangement for stretching or compressing a fiber described is shown schematically in FIG. 1a. An optical fiber 10 has a Bragg grating formed in it in the region 15. Ferrules 11 and 14 are bonded to the fiber by adhesive 16 and 17 and either or both of them may be moved parallel to the axis of the fiber by a stepper motor (not shown). In alternative known arrangements this can be a piezoelectric device. The motion can be arranged to compress or to stretch the fiber. It may be noted that compression is desirable as the fiber is stronger in this mode than extension and greater strain and thus tuning range can be induced. To limit buckling or distortion during compression additional ferrules 12 and 13 are provided which are not bonded to the fiber such that the fiber can move freely in them in a direction axial to the fiber. Additionally ferrules 12 and 13 can slide in a "V" groove or other guiding mechanism such as a parallel spring strip mechanism (not shown). Two ferrules are shown though three or more can of course be used dependent on the length of Bragg grating required. Each one is typically 9 mm long, this length of ferrule being available commercially, but obviously other lengths and diameters could be used.

Figure 1B:
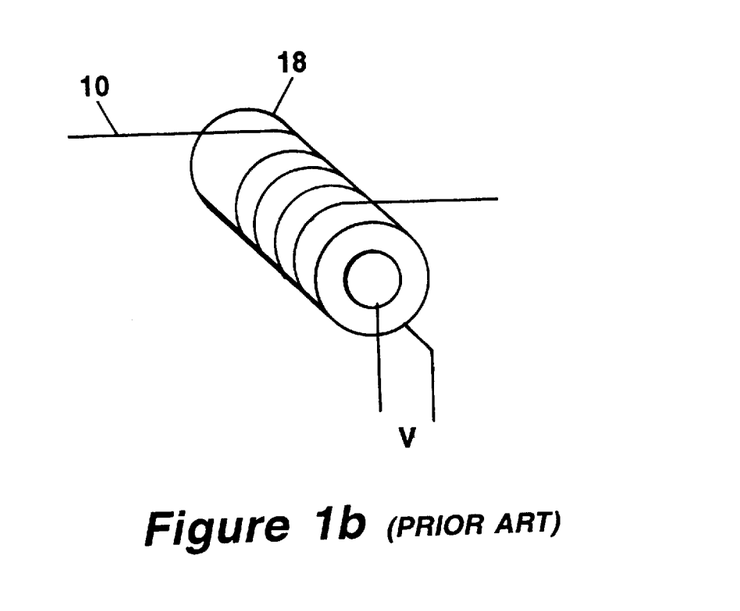
FIG. 1b is a schematic view showing a known cylinder strain system.

FIG. 1b shows schematically an arrangement described in U.S. Pat. No. 5,007,705 for straining a fiber whereby the fiber 10 containing the Bragg grating section is wrapped around a piezoelectric cylinder 18. The cylinder expands or contracts radially on application of a suitable voltage V between the inner and outer surfaces 18 of the cylinder, which are metallised, thus straining the fiber 10.

In all tunable systems so described it is desirable that the reflected wavelength be a unique and linear function of some control command parameter, generally a voltage. However this is not achievable in systems using mechanical or piezoelectric means to affect a change in strain. Piezoelectric actuators suffer from non-linearity and hysteresis which means that if a given voltage V is approached from a previous value less than V the resultant reflected wavelength will be different from the reflected wavelength obtained if V were approached from a previous value above V. Also in lead-screw or other mechanical systems hysteresis in the form of backlash gives the same undesirable effect. Furthermore, in the known mechanical and piezoelectric systems described above, force is exerted on the fiber via a ferrule or other coupling bonded to the fiber using an adhesive. This adhesive layer introduces further hysteresis.

One known approach to compensating for piezoelectric actuator hysteresis and non-linearity is by using a strain gauge on the actuator to measure the actuator extension and provide feedback to a control system that maintains the required extension, as described in Limberger et al. and Iocco et al referenced above. This reduces the problem of piezoelectric actuator hysteresis but strain gauges themselves are not perfectly hysteresis free and problems still persist due to hysteresis in the adhesive bond and any other mechanical linkage between the actuator and the fiber.

DISCLOSURE OF THE INVENTION

It is an object of the invention to avoid or mitigate problems in known systems. It is a further object to provide a system for tuning a fiber Bragg grating in which the reflected wavelength is essentially a unique and linear function of the control command parameter.

According to the invention there is provided an optical fiber strain measurement apparatus comprising an optical fiber, at least one actuator for exerting a force to strain the fiber by compression or extension, and a sensor arranged to sense an absolute value of the strain of the fiber. Because an absolute value is sensed rather than merely monitoring the movement of the actuator itself, as in prior art arrangements, enhanced accuracy is achieved. The actuator and sensor form a closed loop whereby a signal representative of the absolute value controls the actuator to achieve a desired strain. As a result the value of strain desired can be compared with that obtained to control the force exerted by the sensor to obtain the exact desired absolute value.

In a preferred system the measurement apparatus is used with a Bragg fiber grating such that the grating can be tuned by adjusting the strain on it to obtain a precise level of tuning. In the preferred embodiment the actuator comprises a Piezoelectric actuator although any strain-producing mechanism could be used, for example a motor and lead screw.

The absolute value is preferably sensed by sensing the spacing between first and second reference points each substantially fixed relative to the fiber. As a result the absolute value is directly related to the strain on the fiber. In one preferred embodiment the first and second reference points float relative to the actuator force coupling. As a result the only error lies in the hysteresis in the fixing between the reference points and the fiber which will be negligible as the actuator force is exerted at another point. The spacing between the reference points can either be a direct linear measure of the stretching or compression of the fiber, or can be related to changes in the diameter of the fiber when it is in tension in which case the first reference point can be provided be substantially at the surface of the fiber and the second reference point is spaced from the surface of the fiber.

Preferably the sensor comprises a capacitance sensor including first and second electrodes spaced from one another and each substantially fixed relative to the fiber. Capacitance sensors are highly reliable and accurate. In one preferred embodiment the actuator exerts a force on the fiber by virtue of first and second ferrules bonded to the fiber and spaced from one another. In one preferred embodiment third and fourth ferrules are provided intermediate the actuator ferrules for limiting buckling under compression; the further ferrules are fixed relative to the fiber but float relative to the first and second ferrules and one another and carry the first and second electrodes, the electrodes preferably being provided on opposing faces of the further electrodes and a plane perpendicular to the axis of the fiber. As a result one preferred manner of obtaining an absolute measurement of the strain on the fiber is achieved, whether in compression or tension. Preferably yet further ferrules are provided intermediate the third and fourth ferrules, floating relative to the fiber carrying further electrodes on at least the end faces opposing the outer ferrules. It will be appreciated that any number of such additional ferrules can be provided, allowing an extended length of fiber to be placed under compressional tension and the electrodes on the yet further ferrules can be in electrical connection or electrically insulated.

In an alternative embodiment which is cheaper and simpler, the electrodes may be provided on the ferrules through which the actuator force is exerted, on opposing faces thereof. These ferrules may be of a bore diameter arranged to limit buckling under compression, or may be of larger bore such that only a tensioning force may be exerted, which reduces the manufacturing tolerances required. In one embodiment the first ferrule may be of a first diameter and may be received in a bore of the second ferrule of a larger diameter, the electrodes being provided on opposing axial faces. In all embodiments of the capacitance sensor arrangement the diameter of one of the electrodes may be greater than that of the other to reduce axial misalignment effects.

In an alternative preferred embodiment the actuator may comprise a variable diameter cylinder with the optical fiber wrapped around it. In that embodiment a second cylinder surrounds the first cylinder with a space in between. A first electrode is provided at the fiber surface and the second on the second cylinder inner surface. Accordingly as the cylinder diameter is varied the fiber is stretched or compressed in length, and variations in the spacing between the cylinders are a direct measure of the strain, providing yet a further accurate measurement thereof. In a preferred embodiment the first electrode is formed on the fiber itself reducing yet further any possible errors from hysteresis.

In an alternative preferred embodiment, where the variations in diameter of the fiber are measured, the first electrode is provided on the fiber surface and a second cylinder surrounds, and is spaced from the fiber surface and has a second electrode formed on its inner surface. As a result the spacing is measured providing a direct measure of the strain on the fiber. The second cylinder has first and second ends and the first electrode may comprise an electrode component provided in the region of each end, and in electrical connection, providing a useful and simple measure of the spacing across the length of the second cylinder.

BRIEF DESCRIPTION OF THE DRAWINGS

Embodiments of the present invention will be described in more detail below with reference to the accompanying drawings in which:

FIG. 2b is a schematic view showing a detail of the first embodiment shown in FIG. 2a;

FIG. 3b is a schematic view showing a detail of the second embodiment shown in FIG. 3a;

BEST MODE FOR CARRYING OUT THE INVENTION

The components and construction of Bragg fiber gratings are well known to the skilled person and are not described in detail herein, reference being made to the documents incorporated herein above. Throughout the drawings, like numerals designate like parts. It will be recognised that, where appropriate, the relative sizes of certain components may be emphasised for clarity of the drawings.

Figure 2A:
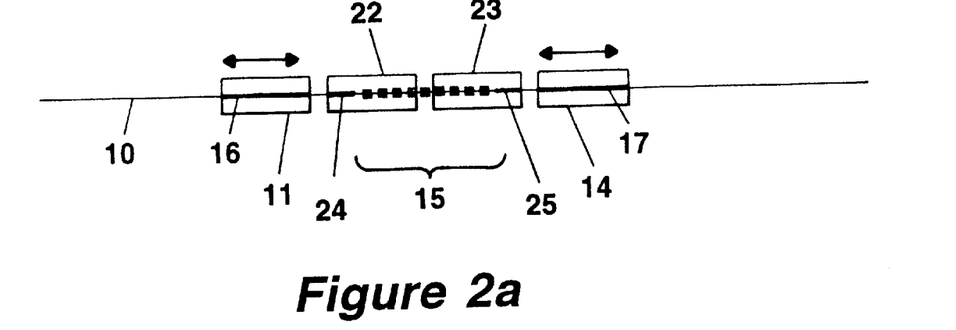
FIG. 2a is a schematic view showing a strain system according to a first embodiment of the present invention.
Figure 2B:
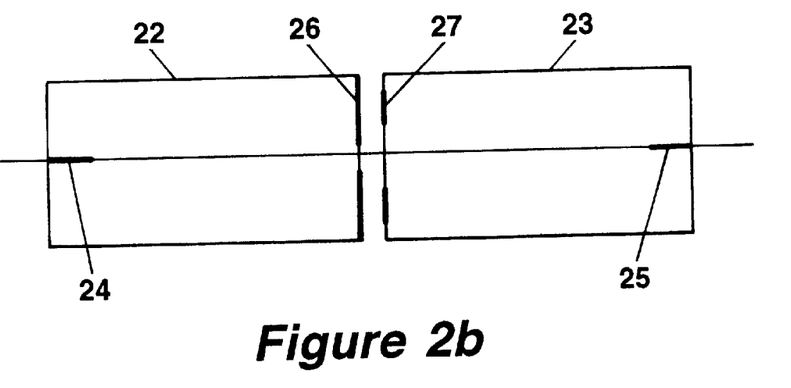
Figure 2C:
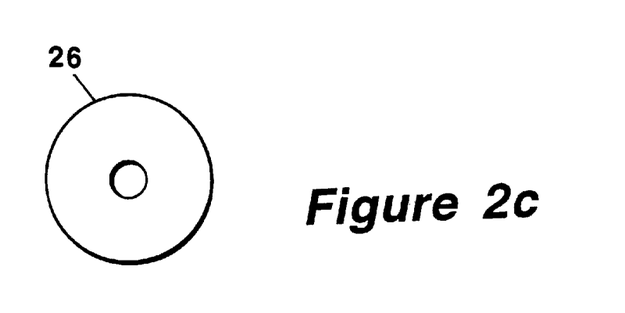
FIG. 2c is a plan view of an electrode employed in the first embodiment.

FIGS. 2a to 2c show a first embodiment of the invention. The floating ferrules 22 and 23 are cylindrical with a central bore through which the fiber is threaded, the bore being dimensioned as is well known to minimise distortion of the fiber under compression. Each ferrule is now bonded over a short distance at a respective opposed end to the fiber by adhesive 24 and 25 which can be of any desired type, for example an epoxy resin such as Epo-Tek 353ND manufactured by Epoxy Technology Inc. Conductive electrodes 26 and 27 (FIGS. 2*b* and 2*c*) are formed on the facing ends of the ferrules, the ferrules being made of an insulating ceramic material, preferably fused silica or zerodur or other insulating material with low thermal expansion coefficient which will be known to the skilled person. The electrodes form an air spaced capacitor, the capacitance of which varies as the separation between the electrodes varies. Electrical connections (not shown) connect these to a capacitance measurement circuit, which is arranged to give an output proportional to the capacitor electrode spacing. The measured spacing is fed back to the device straining the fiber in a closed servo loop which keeps the spacing and thus the strain at the desired value. General examples of capacitance micrometer based servo systems are well known to the skilled person and will not be described here in detail; further description can be found in Thomas R. Hicks, Paul D. Atherton. "The NanoPositioning Book". Queensgate Instruments Ltd. 1997. ISBN 0 9530658 0 4, incorporated herein by reference. Appropriate componentry is sold by Queensgate Instruments Inc., 90 Merrick Avenue, East Meadow, N.Y. 11554, USA as the 'NanoSensor' range. One electrode 26, generally called the target as shown in FIG. 2*c*, is made larger than the other, 27, generally called the probe, as can be seen in FIG. 2*b*, so that any relative lateral motions of the ferrules will not cause a capacitance change and be interpreted as a spacing change.

Capacitance micrometers are inherently linear and hysteresis free. The capacitance sensors, being essentially an air gap, have effectively infinite compliance so very little force is transmitted through the adhesive bonds 24 and 25, the force from the actuator being transmitted to the fibre through the adhesive bonds 16, 17 on the outer ferrules 11, 14. Hysteresis in the bonds 24, 25 is thus reduced to negligible levels. The result of this is that the strain measurement and thus the strain control and resultant wavelength control is effectively linear and hysteresis free, and based on an absolute measurement and in particular is independent of any errors introduced in the actuator or adhesive bonds 11, 14.

Figure 3A:
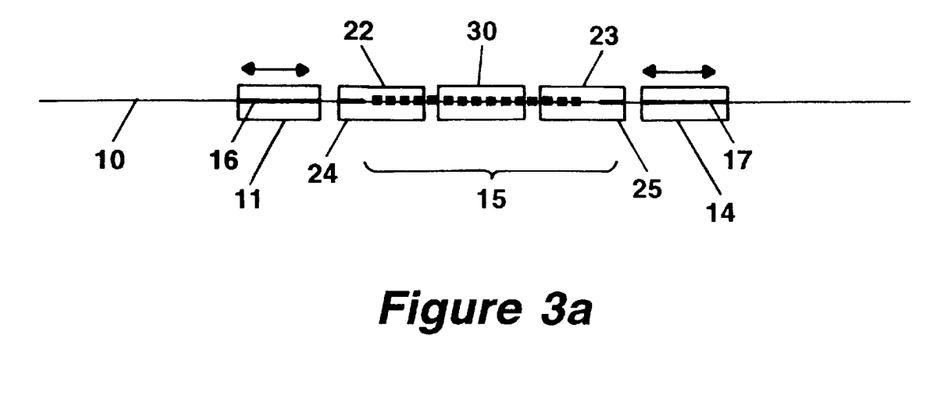
FIG. 3a is a schematic view showing a strain system according to a second embodiment of the present invention.
Figure 3B:
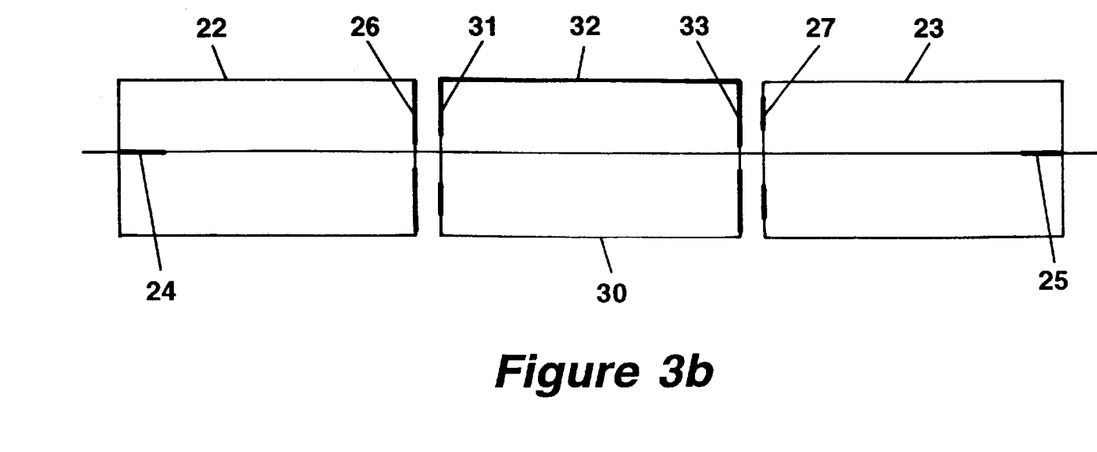

FIGS. 3*a* and 3*b* show an arrangement according to a second embodiment of the invention, which is useful for longer Bragg gratings and where standard ceramic ferrules 22, 23, 30 are still desired to be used. Here an extra fully floating ferrule 30 is introduced between the original ferrules 22 and 23 and is equipped with further probe and target electrodes 31 and 33. These electrodes are joined electrically by a connection 32 which may be a thin wire or conductive track formed on the outer surface of the ferrule 34. The capacitance micrometer acts as before on the capacitance formed between electrodes 26 and 27. The overall micrometer capacitor thus consists of two capacitors in series, which has the same properties as a single capacitor in terms of lack of hysteresis and good linearity though it has half the capacitance value. Alternatively electrode pairs 26 and 31; 33 and 27 could be used as two independent capacitance micrometers without the connection 32 if the expense of the extra capacitance measurement electronics were borne. In either case any asymmetric effects caused by the fully floating nature of the central ferrule 30 are exactly cancelled by the provision of electrodes 26, 27 at either end, as will be apparent to the skilled person.

The principle of adding extra floating ferrules for longer gratings could be extended to the addition of two or more extra ferrules, though with further reduction in micrometer capacitance if independent capacitance measurement electronics were not used.

Figure 4:
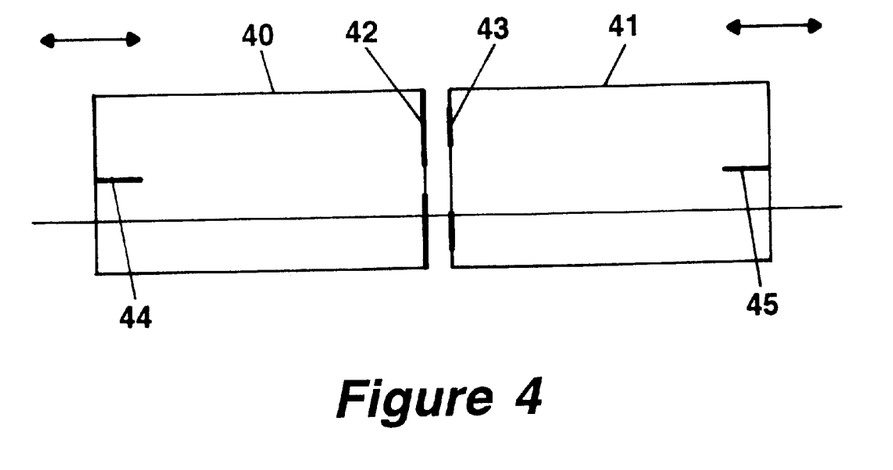
FIG. 4 is a schematic view showing a detail of a strain system according to a third embodiment of the present invention.

A third embodiment of the invention is shown in FIG. 4 and is a simplification of the first embodiment shown in FIGS. 2*a* to 2*c*. Only two ferrules 40 and 41 are used and are bonded to the fibre over short lengths 44 and 45; the floating ferrules are discarded. Either or both ferrules 40, 41 may be moved by the actuator parallel to the axis of the fiber in conventional fashion to generate compression or tension in the fiber as before. The ferrules are equipped on opposing faces with target and probe capacitance micrometer electrodes 42 and 43 for strain measurement as described with reference to the first and second embodiments of the invention. This is a much simpler and cheaper arrangement but has the disadvantage that although an absolute measurement is obtained, hysteresis in the adhesive bonds is not eliminated as the force required to strain the fiber now passes through them. It is recognised that this hysteresis may be minimised by suitable choice of adhesive or by coating the fiber with a metallic layer and soldering it to a similar layer deposited on the end of the ferrule. In general a soldered joint will have less hysteresis than an adhesive joint.

Figure 5:
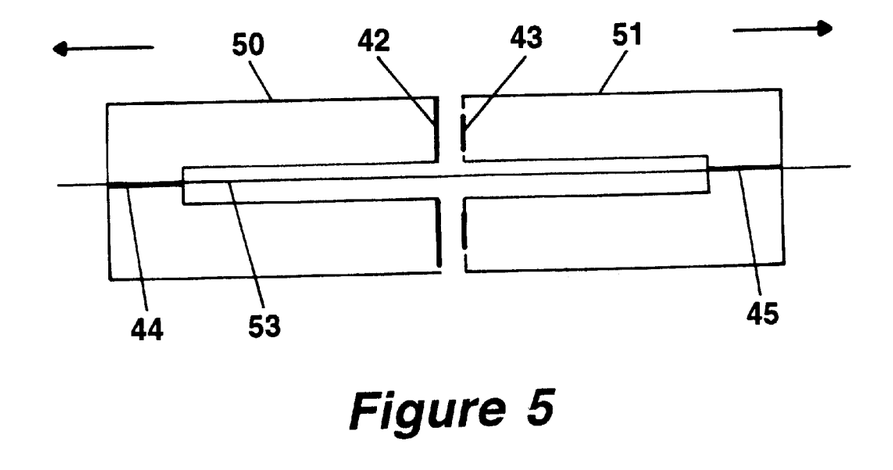
FIG. 5 is a schematic view showing a detail of a strain system according to a fourth embodiment of the present invention.

A fourth embodiment of the invention is shown in FIG. 5. This is a variation of the third embodiment for use when an adequate tuning range may be obtained by tensioning the fiber only, and where compression is not required. Either or both of the ferrules 50 and 51 may be moved to increase or decrease the tension in the fiber but not to compress it. The bore 53 in the ferrules is of increased diameter over much of its length, except at the point of bonding with the fiber, which eases manufacturing tolerances and enables ferrules of arbitrary length to be manufactured more easily. They do not now provide guiding to prevent buckling of the fiber under compression, hence compression cannot be used in this embodiment. Again target and probe electrodes 42 and 43 on opposing faces of the ferrules 50, 51 form a capacitance micrometer for strain measurement.

Figure 6:
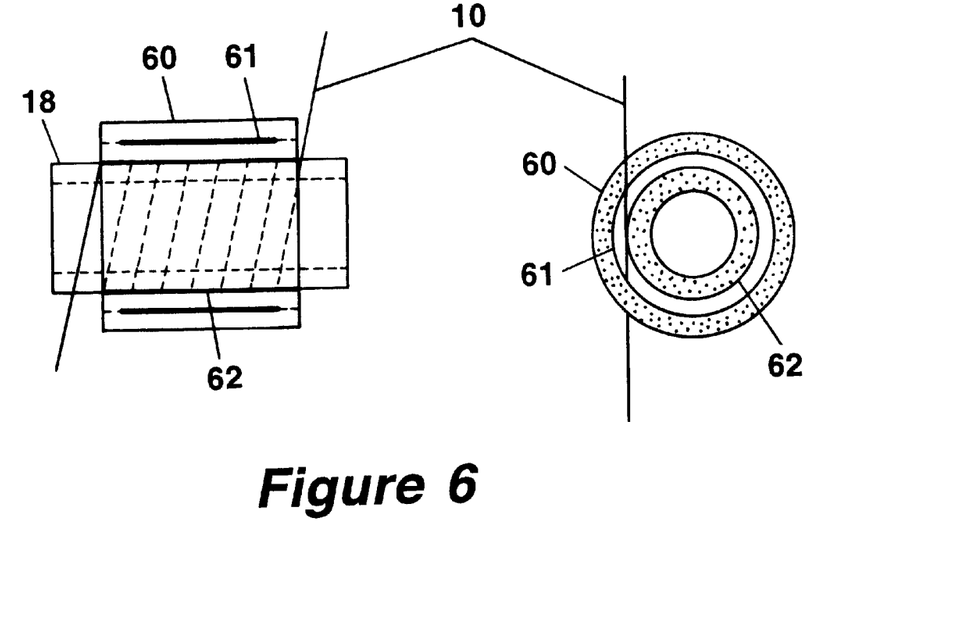
FIG. 6 is a schematic view showing a strain system according to a fifth embodiment of the present invention.

Referring now to FIG. 6 there is shown a cylindrical piezoelectric actuator a configuration of known type and as discussed in relation to FIG. 1*b*. A piezoelectric cylinder 18 having the fiber 10 wrapped around it is capable of being expanded or contracted radially by application of a voltage between its inner and outer surfaces via electrodes (not shown). According to the present invention this arrangement is modified by the inclusion of a capacitance micrometer shown generally at 60, surrounding and concentric with the piezoelectric cylinder 18 and held in place by appropriate spacers (not shown). The micrometer comprises a cylinder made of fused silica or zerodur or other low thermal expansion insulating material the nature of which will be well known to the skilled person. A target electrode 62 is formed on the outer surface of the piezoelectric cylinder 18 and additionally by metalising the fiber wrapped around the cylinder in the region of the cylinder. The probe electrode 61 for the capacitance micrometer is formed by depositing or otherwise attaching a conductive layer to the inside surface of the cylinder 60. In this configuration the capacitance is a measure of the change in radius of the fiber windings and thus the strain in the fiber. By metalising the fiber and keeping the fiber windings tight against each other the target electrode is substantially formed on the fiber itself and so the strain measured is that of the fiber directly and not the piezoelectric cylinder. This minimises the non-linearity and hysteresis associated with the piezoelectric actuator.

Figure 7:
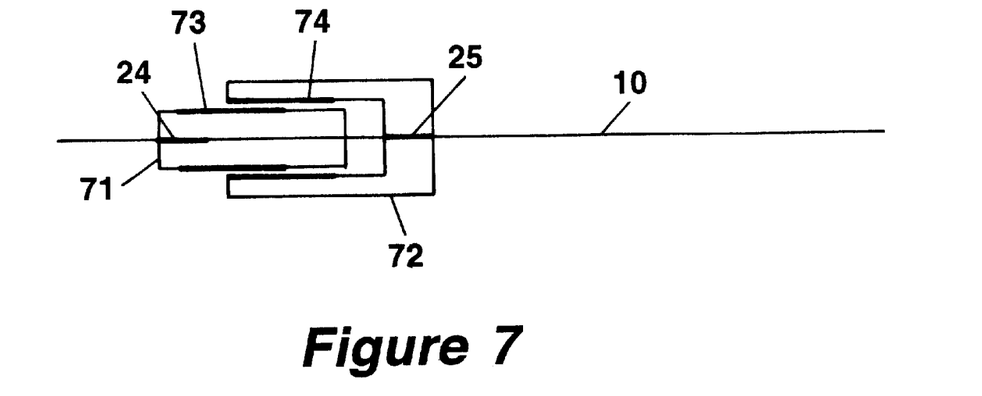
FIG. 7 is a schematic view showing a strain system according to a sixth embodiment of the present invention.

Alternative forms of capacitance micrometer are possible. In FIG. 7, an insulating ferrule 71 bonded over a short length to the fiber includes a capacitance electrode 73 formed on its curved surface. This forms a capacitor with electrode 74 deposited on the inside curved surface of a surrounding, concentric cylinder 72 closed at the other end and bonded at that end to the fiber. Now stretching the fiber 10 causes the capacitance to vary by variation of the overlap area of electrodes 73 and 74.

Figure 8A:
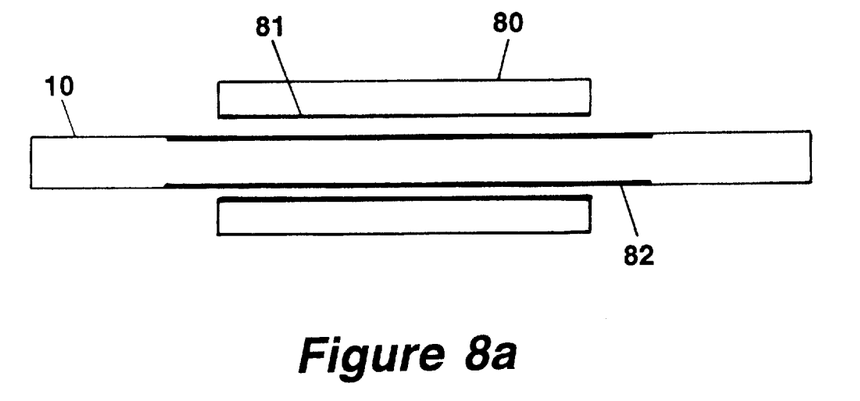
FIG. 8a is a schematic view showing a detail of a strain system according to a seventh embodiment of the present invention.
Figure 8B:
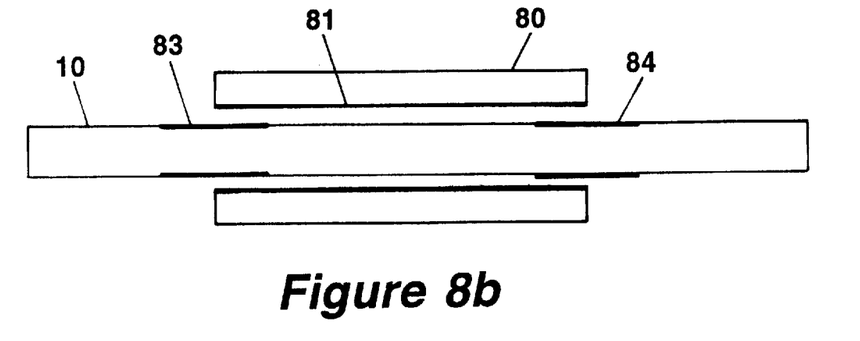
FIG. 8b is a schematic view showing a detail of a strain system according to an eighth embodiment of the present invention.

In a further alternative embodiment shown in FIG. 8a, the fiber 10 itself is used as the substrate for one or more capacitance electrodes. FIG. 8a shows a section of fiber 10 greatly magnified. A section 82 is metalised or otherwise coated with a conductor that forms a capacitor probe electrode. A target capacitor electrode 81 is formed on the inside of a surrounding concentric insulating cylinder 80 spaced from the fiber by appropriate means (not shown). Stretching the fiber causes its diameter to decrease and thus the capacitance to decrease giving a measure of the strain in the fiber. FIG. 8b shows a similar arrangement in which the electrode on the fiber is split into two sections 83 and 84 which are electrically connected together by appropriate conducting means (not shown). As the fiber is stretched, the fiber diameter decreases decreasing the capacitance. In addition the total overlap area of the capacitor electrodes reduces giving a further decrease in the capacitance. This arrangement is thus more sensitive than that of FIG. 8a. The embodiments of FIG. 8 are particularly useful but are limited to cases where the fiber is used in tension.

It will be recognised that combinations of the embodiments described are derivable. For example the simple forms of the embodiment shown in FIG. 4 could be combined with a fully floating ferrule of the type described in relation to FIGS. 3a and 3b, to extend the range of lengths of fiber. This could also be done with the arrangement described in relation to the FIG. 5, or in a preferred alternative the length of the existing ferrules could be extended to extend the range. In addition a mix of floating ferrules and fixed ferrules carrying electrodes can be adopted, for example combining the fixed ferrule of FIG. 4 carrying an electrode 42 with the floating ferrule 22 of FIG. 2a carrying an electrode 27, the actuator force at the other end being exerted by the third, fixed ferrule 41, which need not bear an electrode. As a result only the hysteresis error of one of the two fixed ferrules is a factor.

While the present invention has been illustrated and described as embodied in the particular arrangements set out above, it will be appreciated that the invention is not limited to these particular examples; rather the scope of protection of the present invention is to be determined from the attached claims.

We claim:

1. An optical fiber strain control apparatus for controlling the strain on an optical fiber provided by at least one actuator that exerts a force on the optical fiber by compression or extension, the apparatus comprising:
   a capacitive sensor that includes first and second electrodes the relative capacitance between which changes as the strain on the fiber changes, the sensor providing a sensor signal indicative of the changes in the relative capacitance; and
   a feedback apparatus that receives the sensor signal and provides a feedback signal to the actuator that is indicative of the changes in the relative capacitance and is used to adjust the actuator to achieve a desired strain.

2. The apparatus as claimed in claim 1 in which the optical fiber comprises a Bragg fiber grating.

3. The apparatus as claimed in claim 1 in which the actuator comprises a piezoelectric actuator.

4. The apparatus as claimed in claim 1 in which the sensor senses a spacing between first and second reference points each substantially fixed relative to the optical fiber to obtain an absolute measurement of the strain.

5. The apparatus as claimed in claim 4 in which the actuator exerts a force on the optical fiber via an actuator force coupling, and at least one of the first and second reference points float relative to an actuator force coupling.

6. The apparatus as claimed in claim 4 in which the first reference point is provided substantially at the surface of the optical fiber and the second reference point is provided spaced from the surface of the optical fiber.

7. The apparatus as claimed in claim 1 wherein the first and second electrodes are each substantially fixed relative to the optical fiber.

8. The apparatus as claimed in claim 7 in which the actuator exerts a force on the optical fiber by virtue of first and second ferrules bonded to the optical fiber and spaced from one another.

9. The apparatus as claimed in claim 8 in which third and fourth ferrules are provided intermediate the first and second ferrules for limiting buckling under compression, each fixed relative to the optical fiber, floating relative to the first and second ferrules and one another, and carrying the first and second electrodes.

10. The apparatus as claimed in claim 9 in which the first and second electrodes are provided on opposing faces of a third and fourth electrodes in a plane perpendicular to the axis of the optical fiber.

11. The apparatus as claimed in claim 10 in which at least one further ferrule is provided intermediate the third and fourth ferrules, floating relative to the optical fiber, the further ferrule or respective end ones of the further ferrules carrying further electrodes on each end face opposing a respective face of the third and fourth ferrules.

12. The apparatus as claimed in claim 11 in which one further ferrule is provided, the electrodes on each end face being in electrical connection.

13. The apparatus as claimed in claim 11 in which one further ferrule is provided, the electrodes on each end face being electrically insulated.

14. The apparatus as claimed in claim 8 in which the first and second electrodes are provided on the respective first and second ferrules, the ferrules having opposing faces on their inner ends and outer ends spaced therefrom, and being bonded to the optical fiber only in the region of their outer ends.

15. The apparatus as claimed in claim 14 in which the first and second electrodes are provided on respective opposing end faces of the first and second ferrules.

16. The apparatus as claimed in claim 15 in which the first and second ferrules are of a bore diameter arranged to limit buckling under compression.

17. The apparatus as claimed in claim 15 in which the first and second ferrules are bonded at their respective outer ends to the fiber and are of larger diameter bore at their respective inner, opposing ends.

18. The apparatus as claimed in claim 14 in which the first ferrule is of a first diameter and has the first electrode on its axial face, the second ferrule having a bore of second diameter greater than the first diameter at its outer end and having the second electrode thereon or an opposing axial face, the first electrode being received in the bore of the second electrode.

19. The apparatus as claimed in claim 1 wherein one of the first and second electrodes is greater in dimension than the other to reduce misalignment effects.

20. The apparatus as claimed in claim 1 wherein the actuator comprises a first cylinder of variable diameter around which the optical fiber is wrapped and a second cylinder that surrounds the first cylinder with a space formed therebetween, and wherein the first electrode is fixed relative to an outer surface of the first cylinder and the second electrode is fixed relative to an inner surface of the second cylinder.

21. The apparatus as claimed in claim 20 in which the first electrode is formed on the optical fiber itself.

22. The apparatus as claimed in claim 1 wherein the first electrode is located on a surface of the optical fiber and the second electrode is located on a surface separated from the first electrode in an axial direction relative to a longitudinal axis of the fiber such that changes in an axial diameter of the fiber result in changes in the separation between the first electrode and the second electrode.

23. The apparatus as claimed in claim 22 wherein the first electrode comprises a plurality of electrode segments in electrical connection with one another and longitudinally separated from one another.

24. The apparatus as claimed in claim 1 wherein the first electrode has a location fixed relative to a first location on the optical fiber surface and the second electrode has a location fixed relative to a second location on the optical fiber longitudinally separated from the first location, and wherein the first and second electrodes overlap in a longitudinal dimension of the fiber such that changes in the relative longitudinal positioning of the first and second fiber locations results in a change in the relative overlap between the electrodes.

25. An optical fiber strain measurement apparatus comprising an optical fiber, at least one actuator for exerting a force to strain the optical fiber by compression or extension and a sensor arranged to sense an absolute value of the strain of the optical fiber, wherein the sensor comprises a capacitance sensor including first and second electrodes spaced from one another and each substantially fixed relative to the optical fiber and the actuator comprises a variable diameter cylinder, the optical fiber being wrapped around the cylinder and a second cylinder surrounding the first cylinder with a space formed therebetween, the first electrode being provided at the optical fiber surface, and the second electrode at the second cylinder inner surface, and wherein the actuator and sensor form a closed loop whereby a signal representative of the absolute value controls the actuator to achieve a desired strain.

26. An optical fiber strain measurement apparatus comprising an optical fiber, at least one actuator for exerting a force to strain the optical fiber by compression or extension and a sensor arranged to sense an absolute value of the strain of the optical fiber, wherein the sensor comprises a capacitance sensor including first and second electrodes spaced from one another and each substantially fixed relative to the optical fiber, the first electrode being provided on the optical fiber surface and a cylinder surrounding, and being spaced from, the optical fiber surface, the second electrode being formed on an inner surface of the cylinder, and wherein the actuator and sensor form a closed loop whereby a signal representative of the absolute value controls the actuator to achieve a desired strain.

* * * * *